Figure 1:
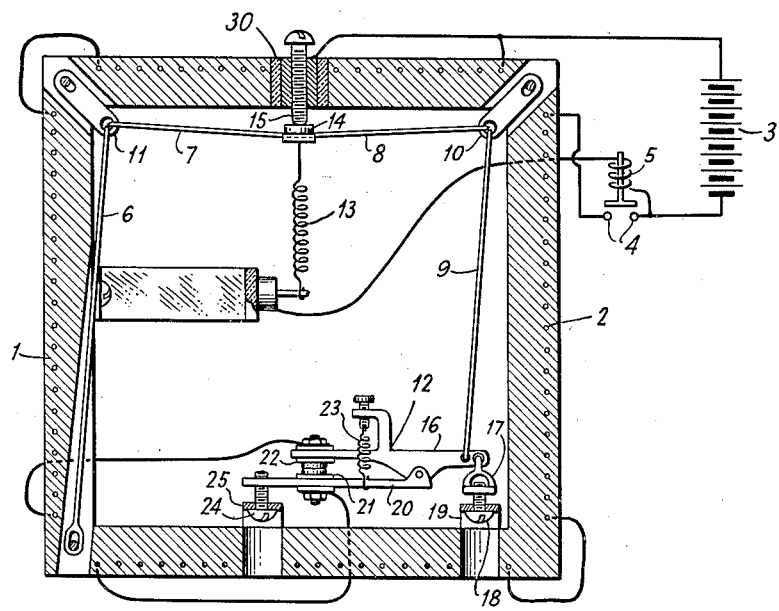

March 21, 1939.     J. L. FINCH     2,151,319
TEMPERATURE CONTROL DEVICE
Filed Feb. 10, 1936     2 Sheets-Sheet 1

INVENTOR.
JAMES LESLIE FINCH
BY
ATTORNEY.

March 21, 1939. J. L. FINCH 2,151,319
TEMPERATURE CONTROL DEVICE
Filed Feb. 10, 1936   2 Sheets-Sheet 2
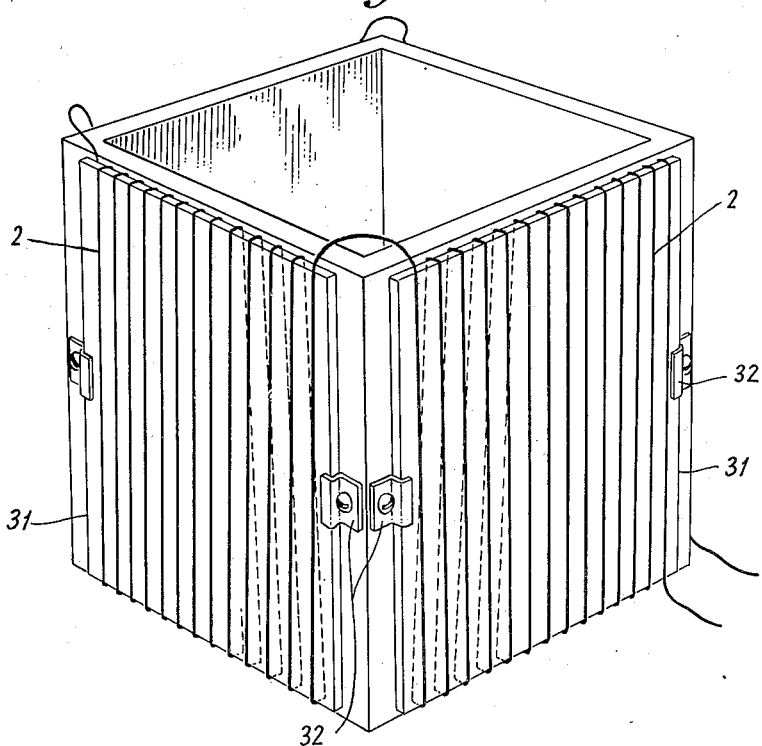
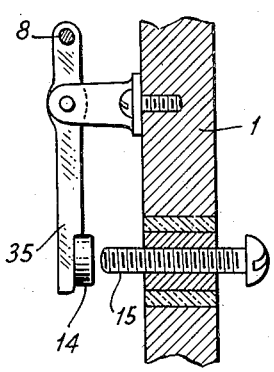
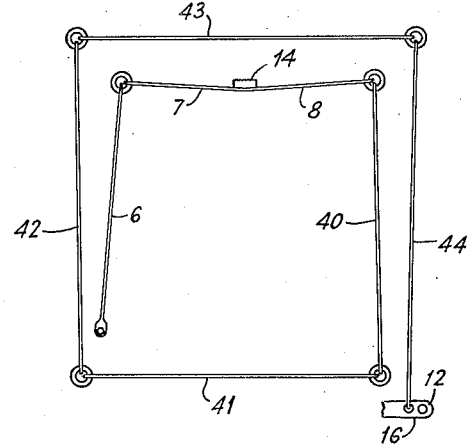
INVENTOR.
JAMES LESLIE FINCH
BY
ATTORNEY.

Patented Mar. 21, 1939

2,151,319

UNITED STATES PATENT OFFICE 2,151,319

TEMPERATURE CONTROL DEVICE

James Leslie Finch, Patchogue, N. Y., assignor to Radio Corporation of America, a corporation of Delaware Application February 10, 1936, Serial No. 63,145

5 Claims. (Cl. 219—19)

This invention relates to a novel and improved temperature control device.

More specifically, this invention relates to a specific type of temperature control device for maintaining exceedingly constant temperature and providing convenient means of extremely fine and accurate adjustment.

An object of this invention is to provide an extremely accurate temperature control device which is substantially constant and reliable in operation over a long period.

Another object of this invention is to provide a temperature control device having a plurality of contact adjustable means which are located external of the container.

A feature of this invention is the employment of the principle of differential expansion with increase in temperature of two different materials. It employs in principle the use of a container for the medium whose temperature is to be controlled to form one portion of the thermostat element. It also conceives the use of a principle similar to that employed in a hot wire meter for multiplying a small motion in order to get a larger motion at the point where a contact is to be made or broken.

Temperature control devices known in the prior art are subject to variations in temperature due to the definite time cycle of the opening and closing of the contacts in the heater circuits. This invention remedies such difficulty by providing a very short time cycle so that the temperature change during the cycle is practically negligible. Likewise, temperature control devices of the prior art are subject to non-uniformity of temperature within the device. For example, the upper portions are often very materially warmer than the lower portions. One of the features of this invention is to maintain the walls on all sides of the container at a substantially constant and equal temperature. This results in all points within the container being maintained at constant equal temperature unless heat is liberated within it.

Many forms of temperature control devices known in the prior art have been found very difficult to change the temperature held by the control element. This invention makes it very simple to change the temperature and to maintain it substantially constant over a relatively long period. Furthermore, in inventions in the prior art it was necessary to provide a heavy metallic container inside the control device for smoothing out the temperature variations caused by the cycles mentioned above. This invention eliminates the necessity for employing substantially heavy containers.

Figure 2:
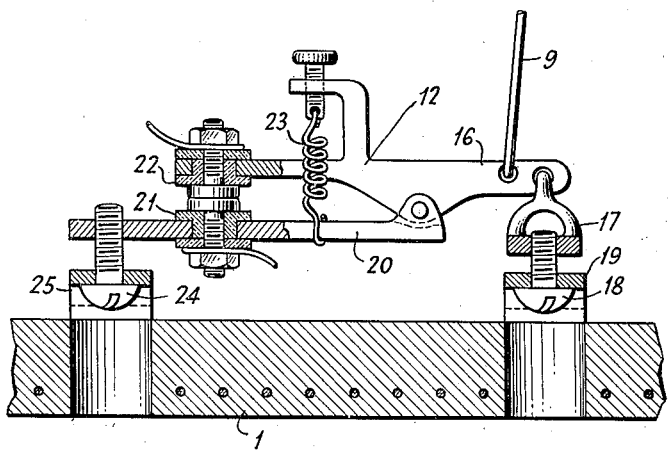

This invention will be more thoroughly understood by referring to the accompanying drawings in which Figure 1 is a section through the temperature control device and a schematic wiring diagram is shown connected thereto, Figure 2 is a detail of the linkage system of this invention, Figure 3 is a detail of a modification in a heater arrangement, Figure 4 is a detailed modification of the improved contact arrangement, Figure 5 is a modification of the linkage system.

Referring now to Figure 1, a box 1 serving as a container for the device to be controlled, surrounds the device whose temperature is to be controlled such as, for example, a piezo-electric crystal. Heat is supplied to the container by passing an electric current through the resistance wire 2 embedded in the walls of container 1. This current is supplied by the source 3 through the relay contacts 4 which are connected in series with the heater wires 2 and a contact within the container. It is desirable that the wires 2 be in intimate contact with the container walls in order that the best results may be obtained. The amount of heat liberated in the walls of the container in any given portion should be equal to the heat required to maintain that portion at the desired operating temperature. Also, for efficient results the conductivity of the container should be relatively high to allow the heat liberated by resistance wire 2 to flow from areas where the heat liberated is in excess to that required in areas where the heat liberated is lower than that required without resulting in any appreciable change within the temperature of the container. The control of the heating is maintained by having located within container 1, a set of linkage members 6, 7, 8, 9, 10, 11, and 12. These linkage members are supported by the container 1 at or near the intersecting points of the central lines of the faces of the container. The junction point between link members 7 and 8 is arranged to be pulled out of line with a spring 13. At this point of junction, a contact 14 is placed which is electrically insulated from the links 7 and 8. An adjustable stationary contact or screw 15 is maintained in the container 1 and is insulated therefrom by an insulating bushing 30. Link members 6, 7, 8, 9, 10 and 11 are preferably made of material having a very low temperature coefficient of expansion, it being desirable that their coefficient of expansion be substantially zero. The container 1 on the other hand is made of material with a relatively high temperature coefficient of expansion, as the fundamental principle of this invention resides in that when the temperature of the container 1 and all other elements within the container rises, the container will expand in a ratio which is greater than that of the links. This relative motion will cause contact 14 to be drawn toward the stationary contact 15 which motion will be resisted by spring 13. The position of contact screw 15 is so adjusted relative to contact 14 that contacts 14 and 15 make connection at the temperature which is desired to be maintained within the container. The initial tension in the spring 13 is so adjusted with relation to the tension which links 6, 7, 8, 9 will stand that the contacts 14 and 15 will be moving at the maximum rate per degree of temperature change at the time when they make contact.

Referring to the linkage system 12 which consists of a number of component parts such as a lever 16, one end of which is secured to the container 1 by means of nut 17, screw 18 and shoulders 19, the link 9 is secured to lever 16 very close to the end where it is held by the adjustable support member 17. This provides a leverage such that when a small force is applied at the left hand end of lever 16, there will be produced a relatively large force in link 9. Conversely, any motion at the end of lever 16 will be reduced greatly in respect to the resultant motion at the end of link 9. A lever 20 is attached to lever 16 at its right hand end. An electrical contact 21 is maintained near the middle of lever 20. A spring 23 draws contact 21 against contact 22 which is maintained on the left hand end of 16. The left hand end of lever 20 is secured to the container 1 by means of a screw 24 and shoulder 25. The spring member 23 has an initial tension greater than that required to hold 21 and 22 in contact for any tension in the links 6, 7, 8, 9, less than that required to make contact between members 14 and 15. The contacts 21 and 22 are connected in an electrical circuit of the heater wire 2 so that when they are opened no heat will be generated. These contacts are provided so that in case relay contacts 4 should not open as required, or if the temperature of 1 should increase beyond the desired value, contacts 21 and 22 will open, thus preventing excess of temperature rise, as any excess temperature rise would produce excessive strains in links 6, 7, 8, 9 and might deform them permanently.

The normal operation of this device is as follows:

When the temperature falls below that desired, contacts 14 and 15 will be separated. This opens the circuit from voltage source 3 through relay windings 5 which allows the armature of relay to drop and make contacts 4 close. Contacts 21 and 22 are also closed. Thus, the circuit is completed from the source of supply through contacts 4 to 21 and 22 so that heat will be generated in the wire 2. This heat causes the temperature of the container 1 to rise and thus increase the temperature so that contacts 14 and 15 will close when the desired temperature is reached. This rise of temperature causes relay winding 5 to be energized thus raising the armature, opening relay contacts 4 and preventing further heat from being liberated in container 1. The temperature will then fall due to heat being carried away from the container 1 and the circuit through contacts 14 and 15 is opened again causing relay contacts 4 to close again and thus repeat the cycle. The opening and closing of contacts 4 are indefinitely repeated thus maintaining the desired temperature. Should it be desired to change the temperature from that previously being held, a rough adjustment can be made by turning screw 18 and a still finer adjustment can be made by turning screw 24.

In the detailed modification shown in Figure 3, the heater wires are generally similar to those of Figure 1 except that the heater wire 2 is located on the outside of container 1 and wound upon a card 31 of insulating material which is pressed against container 1 and held in this position by any suitable means such as clamps 32.

The modified contact arrangement shown in Figure 4 is in all respects similar to the arrangement shown in Figure 1 except that contacts 14 and 15 are placed at the end of a lever 35 which is so arranged that the motion at the junction point between members 7 and 8 is amplified by the additional lever.

In the modified linkage system shown by Figure 5 the device is made more sensitive by the addition of links 40 to 44 inclusive and are arranged to continue around the container 1 in any desired number of times before finally terminating in the thermostat mechanism 12.

It will be obvious to those skilled in the art that heat control can be effected by other means than those shown in the drawings, therefore this invention should not be limited to the modification shown except such limitations that are clearly imposed by the appended claims.

I claim:

1. A temperature control device comprising a rectangular container, said container acting as one element of a regulating thermostat, the other element of said regulating thermostat comprising a plurality of linkages secured to each corner of said container and having relatively low temperature coefficient of expansion compared with that of said container.

2. A temperature control device comprising a container, said container acting as one element of a regulating thermostat, the other element of said regulating thermostat comprising a plurality of linkages located within said container and extending around the interior of the surface of said container several times.

3. A temperature regulating device comprising a rectangular container having a plurality of heater wires embedded in the walls thereof and equally spaced to distribute the heating equally throughout, said container acting as one element of a thermostat device, the other element of said thermostat device comprising at least three links located at each corner and within said container.

4. A temperature control device as in claim 3, having said heater wires cast within the walls of the container.

5. A temperature regulating device comprising a container, the walls of said container acting as at least one element of a thermostat, the other elements of the thermostat comprising a plurality of links, an electrical contact mounted on at least one of said links for actuating relay contacts for controlling an external electrical circuit for heating said container, and a second contact located at the end of another one of said links and electrically connected in series with said relay contacts.

JAMES LESLIE FINCH.